Aug. 13, 1963 G. B. FOSTER 3,100,843
RADIATION DOSAGE LIMITER
Filed Nov. 23, 1959
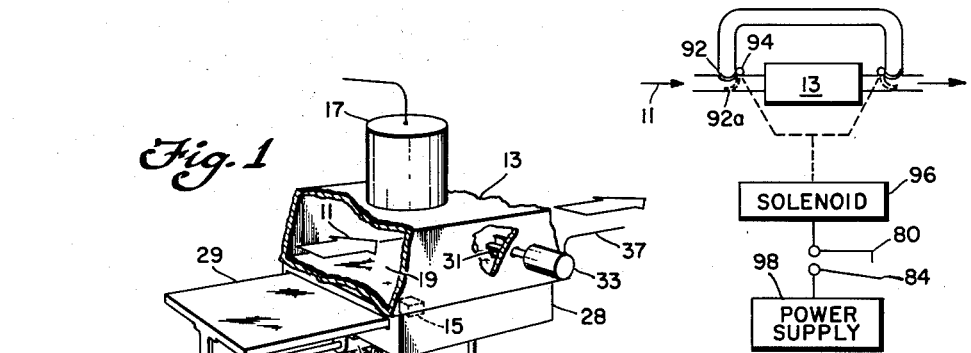
Fig. 1
Fig. 6
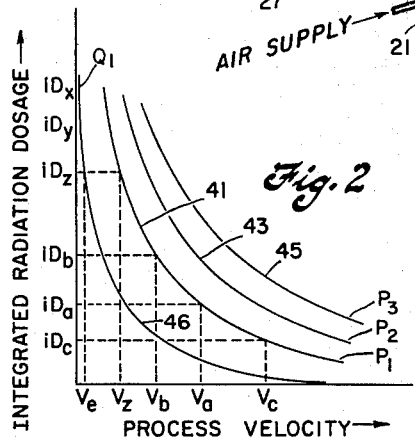
Fig. 2
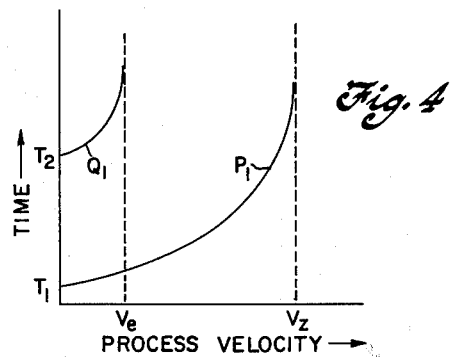
Fig. 4
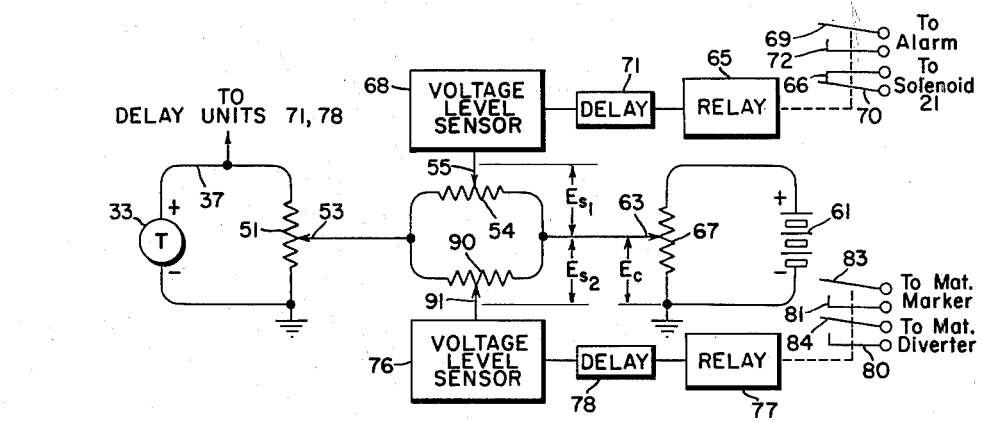
Fig. 3
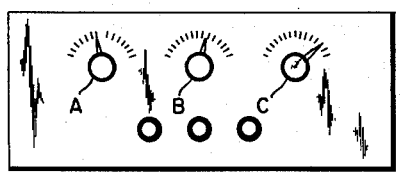
Fig. 5
INVENTOR
George B. Foster
by Anthony D. Cennamo 
United States Patent Office 3,100,843
Patented Aug. 13, 1963

3,100,843
RADIATION DOSAGE LIMITER
George B. Foster, Worthington, Ohio, assignor to Industrial Nucleonics Corporation, a corporation of Ohio
Filed Nov. 23, 1959, Ser. No. 854,622
11 Claims. (Cl. 250—52)

This invention relates generally to nuclear instrumentation for the control of continuous industrial processes and particularly to an automatic radiation dosage limiter for the protection of materials in continuous gauging systems.

The observation of certain properties of materials by subjecting them to fields of radiation of various energies, characteristics, and dosages has been applied to many industrial and domestic operations. More recently, radiation instrumentation has been developed to the extent that emissions from radioisotopes, X-ray tubes, linear accelerators and the like are being applied commercially to the measurements of food and food intermediates. These applications of radiation generally involve very low dosages to the measured material and are not intended to alter the physical, chemical, molecular or atomic properties of the materials involved in the manufacturing operations. This is in distinction from the irradiation of materials such as in the sterilization of foods and their long term preservation. In these applications the properties of the irradiated material are purposely altered. These latter effects are based on phenomena which occur at some energies of radiation and at some total dosages of irradiation, whereby certain changes can be induced in the material. It is apparent that the difference between the effects produced by radiation for material measurement purposes and the radiation applied for material alteration purposes lies at least partly in the amount of radiation dose received by the material. It is important that radiation applied for the one purpose does not inadvertently produce a second, undesired result due to excessive dosage.

Many food products are packaged in such a way that the degree of filling of the package is an important control parameter. Examples of this are the level of fill of liquids in cans and bottles. In this instance, too, radiation has been utilized for the observation of the filling level of containers and the adjustment of the machinery performing the filling operation. Such operations subject the material to irradiation in the course of making the necessary measurements of degree of filling. The measurement of some characteristic of materials which are brought into close proximity to foods, such as packaging materials, might also require attention to insure that deleterious effects are not induced therein through any reaction from radiation.

Certain kinds of radiation are more likely to produce undesired residual effects than others in a specfic material being examined. However, for any kind of radiation there is some value of integrated dosage which could be designated as being "safe," or in any event, not prohibited from use. The present invention teaches a method and means for a manufacturer or other user employing a radiation device to prevent subjecting the material under observation to a total radiation dosage greater than the "permissible" limit.

Accordingly the principal object of the present invention is to provide method and means for limiting the radiation dosage for the protection of materials in continuous gauging systems.

Another object of the present invention is to limit the radiation dosage in a continuous gauging system to a maximum level irrespective of the radiation source size or speed or flow of the product.

It is a further object of the present invention to provide a radiation dosage limiter that is relatively inexpensive and readily adaptable to present day industrial gauging systems.

Other objects and features of the present invention will become apparent from the following detailed description when taken in conjunction with the drawings in which:

FIG. 1 is a typical application of a nuclear radiation gauging system.

FIG. 2 is a graph illustrating the rate of exposure of a product subject to radiation vs. the speed of the process.

FIG. 3 is a schematic diagram of a preferred embodiment of the present invention.

FIG. 4 shows the relationship of the time allowed for the continuation of irradiation for differing process rates.

FIG. 5 is an illustration of an indicator panel suitable for use with the present invention.

FIG. 6 is a simplified diagrammatic showing of a diverter for the process.

Referring now to FIG. 1, there is illustrated a radiation type fluid density gauge. The normally moving material 11 is subject to a radiation field in the test section 13 which separates the radiation source 15 from the detector 17. The radiation field existing at any point in the measured volume is a function of the strength of the source of the radiation, its flux distribution and the absorption suffered by the radiation in passing through intervening material. For the purposes of illustration, assume that the radiation field on the lower surface of the measured volume is isotropic, and that the pipe section is of square cross section. The radiation dosage received by the material lying closest to the emitting surface 19 will receive the highest dosage by reason of passing through the highest field density. Material lying at greater distances will be subjected to a lesser intensity by reason of the energy absorption occurring in the intervening material. In the illustration let $V$=process velocity.

$L$=the path length of the irradiated section.

$iD$=the integrated dosage in rads received by a unit of the process when subjected to continuous exposure throughout the irradiated path length L.

$R$=radiation field in rad per unit time.

$T$=time duration of radiation exposure to unit process. Then the time duration of exposure of unit process in passing through the measured volume is $$T = \frac{L}{V} \quad (1)$$

The dosage received by unit process is then $$iD = R \times T \quad (2)$$

Substituting from (1) gives $$iD = \frac{RL}{V} \quad (3)$$

For any given instrument configuration and point in time the quantities R and L are physical constants. Let the product RL be treated as a coefficient, P, whose value can be obtained by calculation or observation. This yields:

$$iD = P\frac{1}{V} \quad (4)$$

Thus the dosage received by unit process or product which is a part of a continuously or intermittently moving medium exposed in a measuring section or region is inversely proportional to the velocity of the process and proportional to the radiation field intensity. This relationship is shown in FIGURE 2. From this relation, which has the form $$f\left(\frac{1}{x}\right)$$

it is apparent that for any finite value of P the dosage approaches infinity as the process speed approaches zero. The effect of different values of the coefficient P are illustrated in the curves labelled $P_1$, $P_2$, $P_3$ . . . etc. These would correspond to different values of radiation field strength or irradiated path length.

The coefficient P is a constant if the radiation field has a constant intensity with time or it may be treated as a constant with time for practical purposes such as in the use of a radioactive substance of long half life. The other term L of the product RL is a constant arising from a physical dimension of the measured volume, i.e. the path length over which the process is exposed to the radiation.

In the event that the intensity of the radiation source is not constant for practical purposes and the rate at which it is changing in intensity as a function of time is known, means may be employed for automatically varying the value of the coefficient P in accordance with this known variation in radiation intensity. A method of accommodating this variation in the radiation intensity when the radiation source is a radioactive material is described by copending application of Neil Handel, Ser. 722,259, filed March 18, 1958, now U.S. Patent No. 2,942,113, issued June 21, 1960.

The present invention teaches a unique and novel manner and means of limiting the maximum radiation dosage to unit process or product below a pre-selected level. Such dosage levels are illustrated in the values $iD_x$, $iD_y$, $iD_z$ in FIGURE 2. These represent values of radiation dosage which have been fixed as the maximum upper limits to which the process material should be subjected.

In the apparatus of FIGURE 1 let the coefficient of radiation exposure P be of value $P_1$, resulting from a given level of radiation intensity R over the path length L in the test section 13 of the density measuring apparatus shown when the source shutter 29 is open. A tachometer generator 33 provides a signal on line 37 responsive to the process velocity as detected by the rotating device 31. The radiation source assembly and its accompanying mechanical mounting and shielding 28 is fitted with a shutter 29, shown in its "open" position. When "closed" by the action of the spring 39 the shutter serves to reduce the radiation intensity R at the surface 19 to a low value compared to its intensity when the shutter is in the "open" position. A cylinder 25 actuates the shutter by means of the rod 27 moving in response to the application of an air supply to the piston of the cylinder 25 when the solenoid 21 actuates the valve 23.

In normal operation of the gauging device through which the material 11 is flowing, the shutter 29 is withdrawn, i.e. is in the "open" position. Let this condition produce the radiation coefficient $P_1$. The radiation dosage to the material being measured as a function of process velocity is then as shown in the curve 41 of FIGURE 2. Let $iD_z$ be a maximum permissible level of radiation dosage for unit process, fixed in accordance with a technical standard or regulatory ruling. Further, let the process velocity have a normal average value of $V_a$, resulting in a normal average radiation dosage of $iD_a$, and with normal variations of velocity occurring between $V_b$ at the lower limit of velocity and $V_c$ at the upper limit.

Under the conditions of such variations of velocity it is apparent from the relationships shown in FIGURE 2 that the maximum permissible limit of radiation dosage $iD_z$ will not be reached nor exceeded. However, if the process velocity were to be lowered to the value $V_z$, then unit process could be exposed to the dosage $iD_z$ and the allowable limit of dosage may be reached. In an elementary form of radiation dosage limiting apparatus when this condition of low process rate occurs, a limit sensing circuit is immediately actuated which causes the radiation intensity of the surface 19 to be substantially reduced. This action alters the value of the R term of the product $RL=P$. The effect here is seen in the curve 46, corresponding to a new radiation coefficient $Q_1$. A much lower value of V, shown as $V_e$, may now be tolerated prior to potentially exceeding the permissible dosage $iD_z$ to unit process. However since $Q_1$ has a finite value the dosage limit $iD_z$ can still be potentially exceeded as V approaches zero if this condition continues over a sufficient period of time. Thus a further action may be required even after the shutter 29 has been closed in order to assure that the integrated dosage limit $iD_z$ is not to be exceeded when the process velocity goes below the value $V_e$. The lowered level of radiation field and a low value of process velocity may thus still combine to produce a potentially excessive dose of radiation $pD_z$ which can become an actual excessive close $iD_z$.

The nature of the corrective actions required is thus different in the two cases of coefficients $P_1$ and $Q_1$. After the automatic closure of the shutter 29 an alarm may be sounded for the convenience of the process operator to indicate that measurement has been discontinued.

However, as is well known in the art, the action of the radiation shutter does not reduce the radiation from the radiation field to zero, but it merely approaches this level as shielding is increased. If the process material were completely stopped for example, the dosage accumulated by unit process would be:

$$iD = RT \qquad (2)$$

In this instance a time limit of continued exposure would be solely governing the amount of radiation dosage received by every unit irradiated area $a$ in the total irradiated area A. However, under the usual conditions the process material is moving. Therefore, consider specifically the material in the projected differential area $a$ which is at the furthest upstream end of the sensing region corresponding to the commencement of the region 13 defined by the limits of the irradiating surface 19. Let this differential projected area $a$ require a time $T_z$ to pass over the entire length of the projected area of the irradiator 19. The differential area $a$ will thus receive a maximum permissible dose $iD_z$ if the condition of process velocity $V_z$ is permitted to persist over the entire period of time $T_z$ required for the differential area to pass through the entire length of the irradiation section 19.

In the preferred embodiment of the teaching of this invention the alarm signal and corrective action is taken immediately when the process velocity reaches the lower limit $V_z$ which thereby produced a condition of potentially excessive radiation dosage $pD_z$ to unit process. This corrective action of reducing the incident radiation flux is thus taken in anticipation of and to prevent the occurrence of an excessive radiation dosage which would occur if the irradiation were continued over a sufficient period of time. In the event that it is desired to continue process irradiation after the process rate has dropped below the velocity $V_z$, this can be accomplished by providing timing apparatus which will delay the signaling and/or corrective action until unit process has actually received limiting dose $iD_z$. Then if this level of dosage should actually occur the corrective action can be initiated. FIGURE 4 shows the relationship of the time allowed for the continuation of irradiation for process rates between the values $V=0$ to $V=V_z$ and for the condition of radiation coefficients $P_1$ and $Q_1$. It can be seen that for velocities greater than $V_z$ the allowable time of irradiation is infinite, i.e. the process can be continuously irradiated and measured. If the process is stopped the time allowable for continued irradiation would be:

$$T = \frac{iD}{R} \qquad (5)$$

where the radiation intensity R can have values of $R_1$ for shutter open or $R_2$ for shutter closed conditions. These produce the allowable times $T_1$ and $T_2$. A means for accomplishing this more sophisticated protective method is later described.

The irradiation monitoring and calculation operations can be performed by the circuits of FIGURE 3. An analog computer is employed to perform the computations.

$$pD = \frac{P}{V} \qquad (6)$$

and $$pD = \frac{Q}{V} \qquad (7)$$

where $pD$ is the potential dosage to unit process in rads at a process velocity V. P is a coefficient applicable during normal operation of the process, with the radiation shutter open and Q is the coefficient with shutter closed. A voltage representative of the computed value of the potential dosage $pD$ is compared with a preselected value and a signal is obtained when this computed value exceeds the preselected value. Two circuits are used in the illustrative example in FIGURE 3 to provide the needed comparisons for the two coefficients P and Q. Additional apparatus may be employed to delay the commencement of corrective actions until the actual integrated dose exceeding the preset limit is reached, if this should be desired. Thus, corrective action may be delayed until $pD_z$ has been converted to $iD_z$.

In FIGURE 3 let a D.C. voltage proportional to process velocity appear on line 37. This voltage is applied to potentiometer 51 whose arm 53 is calibrated for position in terms of the quantity 1/L where L is the length of the path of the irradiation section 13. Thus longer path lengths correspond to the output of a smaller fraction of the voltage applied to this potentiometer. The output voltage thus obtained is next applied to a second multiplying potentiometer 54 the position of whose arm 55 is proportional to 1/R, the inverse of the radiation field strength.

Thus a smaller proportion of the voltage applied to potentiometer 54 will appear at its output as the radiation field is increased and vice versa. The output voltage from this potentiometer is next applied to the input of a voltage level sensing device 68 which can be any of a large number of such devices well known in the art. The voltage level sensing device is responsive to the difference between the output voltage $E_{s_1}$ of one polarity and the value of a bias voltage $E_c$ of the opposite polarity provided by the potential source 61 modified by the position of the arm 63 of the potentiometer 67. The voltage level sensor 68 operates a relay 65 when the value of $E_{s_1}$ becomes less than the value of $E_c$. The polarity designations shown for $E_{s_1}$ and $E_c$ are illustrative. Both polarities could be reversed if desired.

The value of $E_c$ is chosen to be the voltage analog of the value of radiation dosage which it is desired not to exceed; the voltage $E_{s_1}$ is likewise proportional to the dosage rate received by unit process. Thus the comparison between $E_{s_1}$ and $E_c$ provides the analog of comparing the existing level of potential radiation dosage to unit process with the maximum level desired.

The signal from the voltage level sensor 68 which actuates the relay 65 may be affected by the action of the delay device 71 if it is desired to delay the operation of the relay 65 until the integrated radiation dose received by unit process has actually reached the maximum allowable limit of permissible exposure instead of allowing the sensor 68 to actuate relay 65 when the condition of process rate has been reached which potentially could result in unit process receiving excessive radiation dosage if said condition were to be continued for a sufficient period of time.

When the relay 65 operates it removes power from the radiation shutter position control solenoid 21 through the opening of the contacts 66 and 70. If desired the contacts 69 and 72 can be used to actuate an indicator or alarm to call attention to the fact that the shutter closing action has occurred.

When this first action has occurred, the exposure coefficient has been changed from the value $P_1$ in this illustration, to the value $Q_1$, curve 46 of FIGURE 2. Under this condition a lower value of process rate will correspond to the condition of potential overexposure $pD_z$. In the computer of FIGURE 3 this lower value of exposure coefficient is obtained from the position of the arm 91 of the potentiometer 90, and its value is indicated as $E_{s_2}$. The voltage level sensor 76 is then sensitive to the value of $E_{s_2}$ dropping below the voltage $E_c$. This condition could occur at some low value of process velocity such as that shown in $V_e$ in FIGURE 2.

The delay device 78 acts in a manner similar to the delay device 71. The output of the voltage level sensor 76 indicates that the process rate has reached a value such that unit process could receive an integrated dose of radiation in excess of a preselected upper limit if this condition were to persist over the period of time required for unit process to pass over the path length L within which it is being irradiated.

The delay 71 and 78 is provided in the elements provided by a timing device such as a timing circuit whose delay period is inversely proportional to the voltage appearing on the signal line 37 over a region of process velocities less than $V_z$. An output signal from the voltage level sensor 76 initiates a timing period in the device 78 and likewise the sensor 68 can initiate a timing cycle in the delay device 71. The duration of this timing period is long if the signal on line 37 is large, representing high process velocity. The timing period is shorter as the process velocity becomes slower. The lower limit of process velocity which commences such timing sequence is lower when the coefficient $Q_1$ exists than when coefficient $P_1$ applies. This is reflected in the position of the arm 91 on the potentiometer 90 being set to pick off a higher proportion of the available signal output from the arm 53 than does the arm 55 pick off from the potentiometer 54.

FIGURE 4 shows the relationship of the timing cycles of the delay devices 71 and 78 and the process velocity. At velocities greater than $V_z$, the allowable duration of radiation exposure is infinite since unit process cannot be overexposed. At values of process velocity below $V_z$ and for a radiation coefficient $P_1$ a continually decreasing duration of allowable exposure must be followed. In the limit when $V=0$, the allowable limit is $$T = \frac{iD}{R}$$

where T is the allowable duration of the exposure, $iD$ is the integrated dose and R is the dosage rate of irradiation.

It can be seen that the allowable exposure period is longer for the curve corresponding to the coefficient $Q_1$ than it is for the coefficient $P_1$. This is because the coefficient $Q_1$ corresponds to a lower intensity radiation field, existing when the radiation shielding shutter is closed over the radiation source.

When the timing cycle has expired corrective action is necessary. If the process velocity rises above the value which initiated a timing cycle, then the timing cycle is discontinued and the cycle is reset to zero in preparation for a further timing cycle. Alternatively corrective action may be undertaken without the use of the timing cycle, by actuating the relays 65 and 77 directly from the output of the voltage level sensors 68 and 76 directly from considerations previously treated.

In the event that action of relay 65 occurs, this causes the radiation field to be lowered and appropriate indicators or alarms of this condition to be operated. The process can in the meanwhile continue to pass through the measuring section since it is not receiving an actual or potential excessive dosage of radiation. However measurement action has ceased since the radiation source has been shuttered or otherwise greatly attenuated such as by removing the accelerative voltage from vacuum tube radiation generators.

However, when relay 77 is operated, this indicates that a condition exists which requires the removal of the material exposed from further irradiation in order to prevent the potential accumulation of excessive dosage. In the event that the timing device 78 has been used in connection with the level sensing device 76 to delay the action of relay 77 until the maximum permissible limit of integrated radiation dosage has been reached, then the irradiated material must be removed from further exposure immediately by means of process flow diverters or conveyors as actuated by the contacts 80 and 84 of relay 77. The contacts 81 and 82 of the relay 77 can be used to apply or inject suitable marking or labeling materials into the product if excessively irradiated to assure that it will not be inadvertently processed further into goods sold or otherwise fall into the hands of unsuspecting persons.

In the construction of devices to perform the computations and timing cycles described above many techniques may be employed. Pneumatic mechanisms, hydraulics, magnetics, Hall Effect devices and operational amplifiers for example may be more desirable in some instances.

FIGURE 5 shows a possible arrangement of control settings which would be appropriate to the use of this radiation dosage limiting method. The first or "A" dial is preset to the value of radiation field intensity which exists when the radiation field intensity reduction means are operative, i.e. closing a shutter over the source of radiation if obtained from the emissions from radioactive material, lowering the voltage on an accelerator or vacuum tube generator etc. The second or "B" dial is preset to the normal value of radiation field intensity existing during the measuring mode and the third or "C" dial is preset to the maximum allowable integrated dose to unit process which it is desired or required not to exceed.

The voltage level on signal line 37 can be generated in such a manner as to represent the exposure duration of unit process occurring with materials which are not in continuous movement but are indexed sequentially into the exposure region. Such might occur in processes such as container filling. In this instance an integrator circuit applied to a signal consisting of pulses of voltage whose duration corresponds to the time of exposure can be applied so that the resulting signal appearing on line 37 can be used for computation in the same manner as was the tachometer generated signal.

It can be seen that the particular settings of these controls can be altered at will in response to desired new values of radiation dosage limits arising from legal, medical, physical or any other consideration. It could be readily arranged that a locked cover affixed with an appropriate seal of a regulatory authority be fitted over the control settings and that access to these controls be restricted to persons specifically authorized to make such adjustments. In this way regulatory authorities would be afforded a means for assuring the safety of materials exposed to potentially deleterious amounts of radiation.

Referring to FIG. 6, material flow 11 through the section 13 may be by-passed therearound by means of a gate 92 pivotally mounted at 94 and adapted to swing to the dotted line position 92a. A solenoid 96 is mechanically connected to the gate 92 and actuated by a power supply 98 through normally open contacts 80 of relay 77.

The invention described hereinabove may be varied in construction within the scope of the claims, for the particular device selected to illustrate the invention is but one of many possible embodiments of the same. The invention, therefore, is not to be restricted to the exemplary structure shown and described.

I claim:

1. The method of limiting the radiation dosage received by material moving through a field of radiation of known intensity comprising the steps of establishing an excessive value for said radiation dosage, measuring the rate of said material movement through said field, computing the integrated dosage received by said material in accordance with said rate measurement relative to said field intensity, comparing said computed dosage with said excessive value, and substantially reducing the intensity of said radiation field whenever said computed dosage exceeds said excessive value.

2. The method of claim 1 further including the step of delaying said field intensity reduction for a time proportional to said measured rate of material movement.

3. The method of limiting the radiation dosage received by material moving through a field of radiation of known intensity comprising the steps of establishing a standard value for said radiation dosage, measuring the rate of said material movement through said field, computing the integrated dosage received by said material in accordance with said rate measurement relative to said field intensity, comparing said computed dosage with said standard value, substantially reducing the intensity of said radiation field whenever said computed dosage exceeds said standard value, computing the integrated dosage at said reduced field intensity, comparing said newly computed dosage with said standard value, and interrupting said material movement in said radiation field when said newly computed dosage exceeds said standard value.

4. The method of claim 3 further including the step of delaying the interruption of said material movement for a time proportional to said measured rate of material movement.

5. Apparatus for limiting the radiation dosage received by material moving through a field of radiation of known intensity comprising means for establishing an excessive value for said radiation dosage, means for measuring the rate of said material movement through said field, means for computing the integrated dosage received by said material in accordance with said rate measurements relative to said field intensity, means for comparing said computed dosage with said excessive value, and means for substantially reducing the intensity of said radiation field whenever said computed dosage exceeds said excessive value.

6. Apparatus substantially as set forth in claim 5 which further includes means for delaying the interruption of said material movement for a time proportional to the measured rate of said material movement.

7. Apparatus for limiting the radiation dosage received by material moving through a field of radiation of known intensity comprising means for establishing a standard value for said radiation dosage, means for measuring the rate of said material movement through said field, means for computing the integrated dosage received by said material in accordance with said rate measurement relative to said field intensity, means for comparing said computed dosage with said standard value, means for substantially reducing the intensity of said radiation field whenever said computed dosage exceeds said standard value, means for computing the integrated dosage at said reduced field intensity, means for comparing said newly computed dosage with said standard value, and means for interrupting said material movement in said radiation field when said newly computed dosage exceeds said standard value.

8. Apparatus substantially as set forth in claim 7 which further includes means for delaying the interruption of said material movement for a time proportional to said measured rate of material movement.

9. Apparatus for limiting the radiation dosage received by material moving through a field of radiation of known intensity comprising a tachometer generator for providing a first electrical voltage of a magnitude proportional to the rate of said material movement, voltage divider circuit means providing a second electrical voltage of a polarity identical to that of said first electrical voltage and a magnitude proportional to a standard value of said radiation dosage, a pair of parallel connected resistive elements for algebraically summing the magnitudes of said first and said second electrical voltages, a variable tap on each of said resistive elements each providing a different magnitude of said summed voltage, a first voltage level sensor connected to the resistive tap providing the lesser of said summed voltage magnitudes, said first voltage level sensor having input circuit means responsive to the difference in said lesser summed voltage magnitude and said second electrical voltage magnitude to generate an output signal whenever said difference is substantially zero, means responsive to said output signal for reducing the intensity of said radiation field, a second voltage level sensor connected to the other of said resistive taps providing the greater of said summed voltage magnitudes, said second voltage level sensor having input circuit means responsive to the difference in said greater summed voltage magnitude and said second electrical voltage magnitude to generate an output signal whenever said difference is substantially zero, and means responsive to said last named output signal for diverting said material movement from said radiation field.

10. Apparatus substantially as set forth in claim 9 which further includes means for delaying each of said output signals for a time proportional to the measured rate of said material movement.

11. Apparatus substantially as set forth in claim 9 in which said radiation field intensity reducing means comprises a shutter adapted for rectilinear movement from a first position away from said radiation field to a second position in said field, air cylinder and piston driving means connected to said shutter, and actuator means connected to said driving means for moving said shutter from said first to said second position.

References Cited in the file of this patent
UNITED STATES PATENTS

| | | |
|---|---|---|
| 2,467,812 | Clapp | Apr. 19, 1949 |
| 2,586,713 | Ratcliff | Feb. 19, 1952 |
| 2,613,326 | Herzog | Oct. 7, 1952 |
| 2,714,669 | Wuppermann | Aug. 2, 1955 |
| 2,841,713 | Howard | July 1, 1958 |
| 2,883,555 | Loudon | Apr. 21, 1959 |
| 2,896,084 | MacDonald | July 21, 1959 |
| 2,906,878 | Goodman | Sept. 29, 1959 |
| 2,914,676 | Dijkstra | Nov. 24, 1959 |
| 2,922,884 | Fearnside | Jan. 26, 1960 |
| 2,926,262 | Clark et al. | Feb. 23, 1960 |
| 2,929,000 | Arrison | Mar. 15, 1960 |
| 2,936,374 | Zimmer | May 10, 1960 |